Nov. 14, 1933.　　　　H. CLEMENT　　　　1,935,175
DEVICE FOR MEASURING PUPILLARY DISTANCE
Filed May 13, 1930
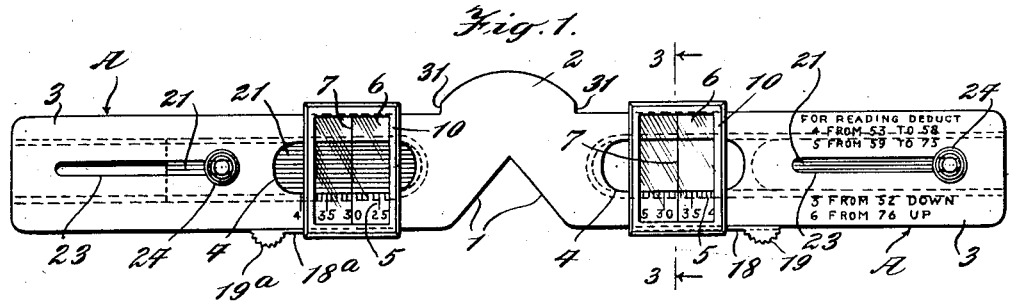
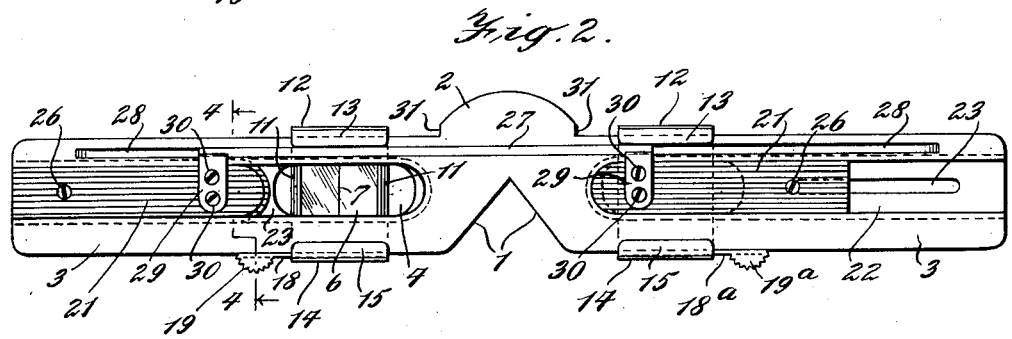
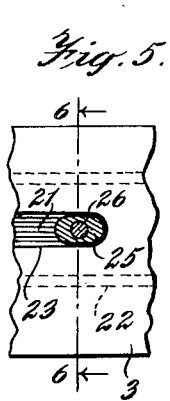 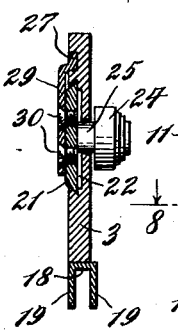 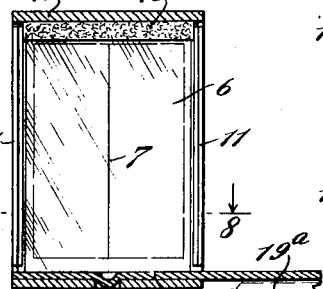 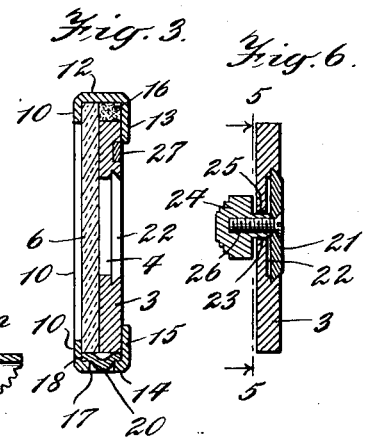
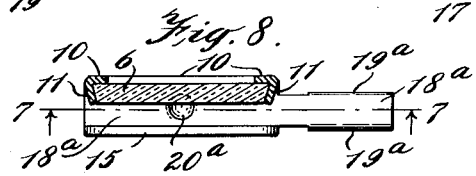
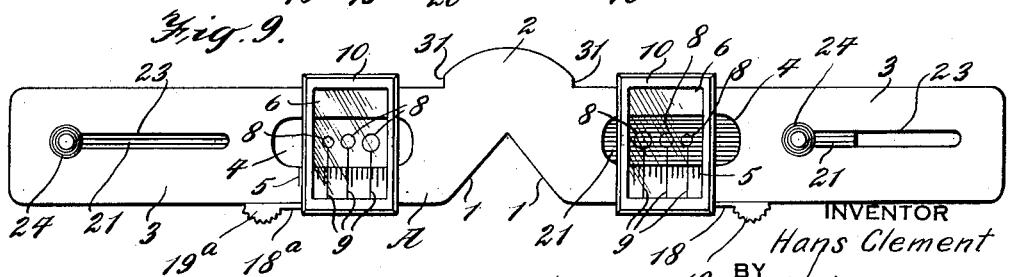
INVENTOR
Hans Clement
BY
Victor D. Borst
ATTORNEY Patented Nov. 14, 1933

1,935,175

UNITED STATES PATENT OFFICE 1,935,175

DEVICE FOR MEASURING PUPILLARY DISTANCE

Hans Clement, New York, N. Y., assignor to General Optical Company, Inc., a corporation of New York Application May 13, 1930. Serial No. 451,941

11 Claims. (Cl. 33—200)

In conducting optical examinations commonly various testing instruments are employed, such as a trial frame, an optometer, a phorometer, etc. These various instruments of course are provided with pupillary adjustments for centering the lenses, etc., but the inherent nature of these optical testing devices precludes the possibility of making accurate pupillary distance measurements therewith, as is well understood by technicians. Therefore, there is need for a simple, accurate and convenient separate device for measuring pupillary distance. Then, in practice, by making the pupillary measurements first, these measurements may be used as a safe guide throughout all of the subsequent tests with the various other instruments, such as above noted. Such a pupillary measuring device is provided by this invention.

This invention has particular reference to a device to be used by optometrists or optical refractionists in making optical examinations in order to fit patients with glasses. The interpupillary distance is the distance between the centers of the pupils of a patient's eyes when looking straight ahead and is commonly taken without convergence of the eyes. This measurement is usually made by laying a rule on the bridge of the patient's nose and observing by the scale on the rule the distance between the pupils. For obvious reasons a measurement taken in this way cannot be exact, even to determine merely the interpupillary distance. Moreover, it is desirable to measure the distance of the pupil of each eye from the center of the bridge of the nose. This distance almost invariably differs for the two eyes. An average measurement, for example, may be 32 millimeters for the right eye and 33 millimeters for the left eye, this measurement being the distance of the pupils from the center line of the bridge of the nose. Such a measurement may be briefly and conveniently recorded as 32—33 equal 65, the latter numeral of course being the interpupillary distance. There are now sold on the market rather elaborate and relatively expensive instruments for obtaining these measurements.

One of the objects of this invention is to provide a relatively simple, inexpensive and conveniently usable device of this character which will give accurate measurements such as above noted and which will present to the refractionist or operator a fixed contemporary indication of the measurement for each of the two eyes as to the distance in millimeters of the center of the pupils from the center line of the bridge of the nose, so that thereby, after the measuring has been completed, the complete result may be quickly recorded in the manner above noted. This invention is embodied in a device for measuring pupillary distance which is in general of the rule type. More particularly, however, the pupillary distance-measuring device of this invention operates substantially on the slide rule principle.

In carrying out the invention, the main member of the device is a light, flat strip which in its lower edge at the middle has a rather large suitably shaped notch forming a nose-bridge to fit over the bridge of the patient's nose. Elongated sight openings are provided longitudinally in the strip at each side of the nose-bridge and serve as observation openings. A slide on the strip at each side of the nose-bridge carries a transparent glass having thereon a vertical pupillary line which cooperates with a millimeter scale provided on the front face of the strip below each observation opening, or there may be a plurality of such lines each leading from one of a series of pupillary circles of graduated sizes formed on the glass. Each of the slides is operable independently of the other slide and has a sliding frictional engagement with the cross strip, so that pupillary measurements may be quickly made in succession of the two eyes, as to the distance of the center of the pupil of each eye from the center line of the bridge of the nose, with a fixed indication provided of both of these measurements presented at the same time, and of which a permanent record may be conveniently made after the measuring has been completed for both eyes.

It is desirable to have one eye occluded, that is, the observation opening for that eye closed while the other eye is being observed. Accordingly, a shutter for each of the observation openings is slidable at the back of the strip and may be operated by means of a button which projects to the front through a slot in the strip. In further carrying out the invention, the two shutters are connected together by means of a cross strap, so that the movement of one shutter is transmitted to the other. Thus, when one shutter is opened, the other necessarily will be closed, and vice versa.

Other objects and advantages of the invention will hereinafter appear. Also the invention further includes various features of construction and combinations of parts, as will appear from the following description.

Two slightly variant embodiments of the invention, illustrated in the accompanying drawing, will now be described and thereafter the invention will be pointed out in claims, reference now being had to the drawing, in which:

Fig. 1 is a front face elevation of a pupillary distance-measuring device embodying the invention;

Fig. 2 is a rear elevation of the same, turned end for end with reference to Fig. 1;

Fig. 3 is an enlarged vertical section on the line 3—3 of Fig. 1;

Fig. 4 is a similar section on the zig-zag line 4—4 of Fig. 2;

Fig. 5 is a partial longitudinal vertical section on the line 5—5 of Fig. 6;

Fig. 6 is a transverse vertical section on the line 6—6 of Fig. 5;

Fig. 7 is a longitudinal vertical section on the line 7—7 of Fig. 8;

Fig. 8 is a horizontal section on the line 8—8 of Fig. 7; and

Fig. 9 is a front face elevation, similar to Fig. 1, showing a further development of the invention.

The embodiments of the invention shown in the drawing comprise a main frame member in the form of a light cross strip which is generally designated by the capital letter A. This cross strip A may be formed from any suitable material such for example as celluloid or aluminum. It will be noted that this cross strip A is symmetrical in construction throughout as to its opposite or right and left end portions from a vertical center line outward in each direction. In its lower edge at the middle of its length this cross strip A is provided with a deep nose-bridge notch 1 of substantially the shape of an inverted capital letter V. The inclined opposed shoulders formed by this notch 1 constitute a nose-bridge which will accurately position the strip A on the bridge of the nose of the patient substantially regardless of the shape of the bridge of the nose. The upper edge of this strip A is provided with an upwardly projecting strengthening nose-bridge arch 2 above the nose-bridge notch 1, so that thereby this strip is not unduly weakened by the forming therein of the nose-bridge notch 1 and whereby, in fact, the strip-positioning nose-bridge as a whole is formed by the arch provided between the nose-bridge notch 1 and the top of the upwardly projecting arch 2.

The elongated end portions 3 of the cross strip A at the opposite sides laterally of the nose-bridge notch 1 and nose-bridge arch 2 are of uniform width throughout their length and are of equal length and in longitudinal alignment with one another. At each side of the nose-bridge notch 1, in alignment with the upper portion thereof and equidistantly spaced from the apex of this notch, the strip A in its end portion 3 is provided longitudinally with an elongated sight opening 4, these openings being of equal length and in longitudinal alignment with each other and serving as observation openings. Each end portion 3 of the strip A, immediately below its observation opening 4, has formed on the front face thereof a graduated millimeter scale 5, these two scales of course being calibrated to read in opposite directions outwardly from the nose-bridge notch 1. Both of these scales, of course, have a zero point in common coinciding with the apex of the V-notch of the nose-bridge, and are shown (Fig. 1) as having their graduations numbered from a minimum a little below 25 millimeters up to a maximum of 40 millimeters, for indicating pupillary distance from the center line of the nose-bridge.

Two independently operable pupillary-measuring slides, each of which has frictional sliding engagement over one of the end portions 3 in cooperation with its scale 5, are constructed to operate substantially on the principle of the slide rule. Excepting as to its operating handle, hereinafter described, these two slides are of duplicate construction. Therefore, excepting in the minor respect above noted with reference to their operating handles, a description of one slide suffices for both.

At the front face of its strip end portion 3 each slide carries a rectangular transparent glass 6 having thereon, at the middle of its width laterally, a pupillary indicating line 7 which cooperates with the scale 5 to indicate the distance of the pupil of that eye outwardly from the apex of the nose-bridge notch 1, such measurement most desirably being made from the center of the pupil of the eye with the line of vision of the eye directed straight ahead forwardly, that is, without either convergence or divergence.

A further development or refinement over the vertical indicating line 7 is shown in Fig. 9, in which the transparent glass 6 has formed thereon a series of circles 8, shown as three in number, providing pupillary openings of decreasing graduated size in an outward direction from the nose-bridge notch 1 and in horizontal alignment with reference to the elongated observation opening 4 at the middle of its width vertically. The pupillary openings provided through these circles 8, proceeding outwardly in the series, may be, for example, respectively five millimeters, four millimeters and three millimeters. From each of these circes 8 and in line with its center a vertical indicating line 9 extends downwardly across the scale 5 in cooperation therewith. Obviously any one of these circles 8 may be employed, according to the size of the patient's pupils, over which the pupillary opening provided by the selected circle is to be centered, merely by moving the slide. Of course the scale indication is to be read from the indicating line 9 which belongs to the one of the circles 8 which is being used. The different sized pupillary openings provided by the graduated circles 8 render it easier to make an accurate measurement in the case of pupils which are of larger size than the usual average. Excepting merely for the above noted different indicating marks 8 and 9 on the glass 6, the construction of the pupillary distance-measuring device shown in Fig. 9 is the same throughout as that shown in Figs. 1 and 2.

The glass 6 is carried by a sheet metal frame which at the front of this glass provides a rectangular window-frame 10. This window-frame 10 at the rear thereof is provided with inturned lateral flanges 11 which engage with the beveled edges of the glass 6 for holding the latter in place, as most clearly appears in Fig. 8. It may be noted, for clarity, that Figs. 7 and 8 illustrate the slide which appears at the left side in Fig. 1 but which appears at the right side in the rear view of Fig. 2, in connection with which these Figs. 7 and 8 are more readily readable. At its top the rectangular window-frame 10 is provided with a rearwardly-turned flange 12 extending over the upper edge of the glass 6 and having a downwardly-turned terminal portion 13 which engages with the rear face of the upper margin of the strip end portion 3, while at the bottom this window-frame 10 is similarly provided with a rearwardly turned lower flange 14 extending beneath the lower edges of the glass 6 and strip portion 3, the rear face of the lower margin of which is engaged by an upturned terminal portion 15 of this lower flange 14.

These above described upper and lower flanges on the glass-carrying window-frame 10 guide the latter on the end portion 3 of the main cross strip A. It will be noted that the glass 6 at its upper edge projects above the upper edge of the strip portion 3. In the space thus provided above the strip portion 3, a friction member 16 is held between the glass 6 and the downturned terminal portion 13 of the top flange 12. This friction member 16, which may be of felt or other suitable material, is carried by the slide to have frictional sliding engagement with the upper edge of the strip portion 3. The lower edge of the glass 6 is flush with the lower edge of the strip portion 3. The lower flange 14 is spaced somewhat below these lower edges and is centrally provided with an aperture 17. This space above the lower flange 14, together with the aperture 17 therein, provides for holding in place and anchoring an operating handle for the glass-carrying window-frame 10 of each of the two slides, each of which as so far described is a duplicate of the other.

The handle for the right hand slide, corresponding to the left eye of the patient, appears at the right in Figs. 1 and 9, at the left in Fig. 2, and is further shown in Figs. 3 and 4, while the handle for the left hand slide, corresponding to the right eye of the patient, appears at the left in Figs. 1 and 9, at the right in Fig. 2, and is shown more in detail in Figs. 7 and 8. The slide handles are of sheet metal and may be formed by stamping operations. The corresponding parts of these two slide handles will be given different reference numerals merely for distinguishing them on the drawing.

The right hand slide handle has a shank 18, the left hand end portion of which is interposed between the bottom flange 14 of the window-frame 10 and the lower edges of the strip end portion 3 and glass 6, this inner portion of the shank 18 being of the full width of the space between the window-frame 10 at the front and its upturned terminal flange 15 at the rear (Fig. 3) and extending entirely across or through this window-frame at the bottom as indicated by dotted lines in Fig. 1. This shank 18 projects away from the window-frame 10 outwardly or towards the right and adjacent to its outer end is provided with a pair of downwardly-turned wings 19 having their edges of curved contour and roughened or notched as shown to form a finger-piece. This outwardly projecting portion of the handle shank 18 is desirably made narrower by offsetting it rearwardly, so that thereby this narrower portion, beneath the strip portion 3, will at most project only slightly to the front of this strip portion 3 and will be substantially flush or in alignment therewith, as will be evident by a comparison of Figs. 3 and 4. At an intermediate point of its wider portion, this shank 18 is provided with a downwardly-indented lug 20 which enters the hole 17 in the window-frame flange 14, thereby to form an anchor for this handle shank 18.

The corresponding parts of the left hand slide handle are its shank 18a, finger-piece wings 19a, and anchor lug 20a (Figs. 7 and 8). Figs. 7 and 8, it will be noted, are in a reversed position from left to right, corresponding in that respect to the rear view shown in Fig. 2, at the right side. The rearward offsetting of the outwardly projecting portion of the handle shank 18a, to bring it substantially into vertical alignment with the lower edge of the strip portion 3, will be evident from Fig. 8.

By reason of having their handles attached as separate parts, the two window-frames 10, together with the above noted flanges 11 to 15 inclusive, may be of identical construction as shown, it being noted that the aperture 17 in the lower flange 14 for anchoring the handle shank in place is centrally located, so that thereby the handle shank may be attached so as to project either towards the right or to the left. By reason of the fact that the handle shank 18 projects towards the right, while the handle shaft 18a projects towards the left, while the projecting portions of both of these shanks is offset towards the rear, it will be evident that the two handle members as a whole are slightly different, so that thereby one becomes a right hand handle and the other a left hand handle. However, it is obvious that the flat blanks from which these two handles are formed will be of exactly the same shape, requiring only to be bent from one side for forming a right hand handle, or from the other side for forming a left hand handle.

By having the finger-piece wings 19 and 19a spaced outwardly from the slides, away from the nose of the patient, and located just below the lower edge of the strip portions 3, these finger-pieces are rendered easily and conveniently accessible for moving the slides. It will be noted that the end portions 3 of the main cross member A are sufficiently elongated that they project outwardly or laterally for a considerable distance beyond the outer ends of the elongated observation openings 4. This permits the slides, comprising the glass-carrying window-frames 10, to be moved outwardly entirely beyond the outer ends of the elongated observation openings 4 whenever so desired and also serves other purposes, as will presently appear.

One eye of the patient should be occluded while the pupillary distance of the other eye is being measured, in order to enable this latter eye to be directed straight ahead. The cross strip A is desirably of opaque material, and at the back of this strip a longitudinally slidable opaque shutter 21 is provided for each of the observation openings 4. This shutter 21 is a flat strip-like piece of relatively thin metal, as compared with the thickness of the main cross strip A, and is of only slightly greater width than that of the observation opening 4. The shade lines on the drawing indicate that the shutters 21 are black, and the main cross strip A may also be black if desired. The shutter 1 is countersunk into the back of the cross strip end portion 3 substantially flush therewith at the back and is guided in a shallow groove 22 which extends from a point just inward towards the nose-bridge notch 1 from the inner end of the observation opening 4, outwardly entirely to the outer end of the strip portion 3, the observation opening 4 being provided through the bottom of this groove 22 adjacent its inner end.

The upper and lower edges or sides of this groove 22 are undercut or dovetailed and the shutter plate 21 has beveled upper and lower edges entering and snugly but slidably fitting in the dovetail of this groove, so that thereby the shutter 21 will be held in place and slidably guided. The longitudinally slidable shutter 21 is of considerably greater length than the length of the elongated observation opening 4, so that when this opening is closed by the shutter, the latter will extend for a considerable distance beyond the outer end of this opening, as appears most clearly at the right side of Fig. 2, and when the observation opening 4 is uncovered by the shutter 21, the outer end of the latter will then be even or flush with the outer end of the strip portion 3, as shown at the left in Fig. 2, which, it will be remembered, is a rear view. Thus each of the shutters 21 is slidable inwardly towards the nose-bridge notch 1 in order to close the observation opening 4, and slides outwardly beyond this observation opening when the latter is to be uncovered or opened.

A longitudinal slot 23 is provided through the strip end portion 3 between its outer end and the outer end of the observation opening 4. An operating button 24 for the shutter 21 has a flattened stem 25 passing inwardly through and guided in the slot 23. This operating button 24 is firmly secured to the outer end portion of the underlying shutter plate 21 by means of a screw 26 the flat head of which is countersunk into the back of the shutter 21. The slot 23, of course, is of the correct length so that its outer end will permit the entire uncovering of the observation opening 4 when the shutter 21 is at its outer position, while, when the shutter 21 is moved to its inner position, the inner end of this slot 23 provides for the complete closure of the observation opening 4 by the inner end portion of the shutter 21, which then at its inner end, when at its inner position, it will be noted, abuts against the inner end of its guide slot 23, as is clearly shown in the drawing in each respect, for the respective shutters. Thus the operating button 24 is in a convenient position, projecting from the front face of the outer end portion 3, this button being in the form of a rounded head the front of which is desirably roughened as shown for providing a secure finger grip.

As a further feature of the invention, the two shutters 21 are connected together by means of a cross strap 27 extending longitudinally or horizontally at the back of the main frame strip A above the nose-bridge notch 1, so that thereby, movement of either one of the shutters 21 will be transmitted to the other. This cross strap or connecting bar 27 is slidable in a long longitudinal groove 28 in the rear face of the cross strip A, into which this cross strap 27 is thereby countersunk substantially flush therewith, this groove 28 extending above the guide grooves 22 for the shutters 21, as well as also, of course, above the apex of the nose-bridge notch 1. At each of its ends this connecting bar or cross strap 27 is provided, in the same piece therewith, with a rearwardly offset and downwardly extending flat lug 29 which extends substantially across the rear face of the shutter 21 adjacent to its inner end and is firmly secured thereto by means of a pair of small screws 30, the flat heads of which are countersunk into the back of this lug 29. This connecting together of the two slidable shutter plates 21 for unitary sliding movement in the same direction necessarily assures that when one of the shutters 21 is opened, for observing one of the eyes of the patient, then the other shutter 21 will be closed, for occluding the other eye, and vice versa. Also only a single operation is required for shifting both of the shutters 21, which may be accomplished by means of either the right hand or the left hand operating button 24.

Shoulders 31 formed at the ends of the nose-bridge arch 2 limit the inward movement of the slides, while the operating buttons 24 form outer stops for the slides.

The above-described pupillary distance-measuring device of the present invention is particularly adapted for use in practice to obtain the hereinbefore noted pupillary distance measurements as the first step in the examination, so that thus thereafter every pair of lenses used for test, or to be used finally for wear, may be set in accordance with these previously determined pupillary distance measurements, and many factors of possible error in the examination thereby eliminated. Also, with all factors considered, it is more desirable and conducive to the greatest accuracy to take these pupillary distance measurements from the two points representing the center of each pupil, as hereinbefore described. These measurements are taken while each eye alternately assumes its primary position, that is to say, with the patient's eye alternately fixating the equivalent of an infinitely distant point. This will give the correct pupillary distance measurement for distant vision. When it is desired to fit the patient with reading glasses, in which of course there must be convergence of the two lines of vision from the eyes, then the correct centering of the lenses may be obtained by a simple calculation which is indicated by the table or formula shown in Fig. 1 on the front face of the main cross strip A near its right hand end. It has been found that this reading interpupillary distance can be calculated more accurately from this distance measurement than it can be measured directly. Optometrists are familiar with this calculation and formula, and therefore it need not be here further explained.

In using the slide rule pupillary distance measure or gauge of this invention, the optometrist places himself squarely in front of his patient and presents his own eyes alternately as fixation points. The pupillary distance is then measured successively, one after the other, for each eye, from the center of its pupil to the center of the bridge of the nose, it being more desirable to begin with the right eye of the patient. It will be noted from the drawing that in Fig. 9 the device is arranged or set for taking this pupillary measurement of the right eye of the patient, as is indicated by the position of the shutters 21, while Figs. 1 and 2 show the positions of these shutters for obtaining the pupillary measurement of the left eye.

After these two pupillary measurements have been thus separately taken, they may be added together for obtaining the pupillary distance between the two eyes, that is, the interpupillary distance, which is commonly referred to as the P. D. It might be here noted that in remarkably few cases are the eyes symmetrically placed in relation to the center of the bridge of the nose. In an example of such a case the record could be 30—30 equal 60 mm., while in a different case, for example, it might be 29—31 equal 60 mm. An important advantage of the device of this invention is that each slide not only affords extreme accuracy in locating the center of the pupil and in reading the scale, but the indication given remains fixed as long as it may be needed, that is, until the record, as above noted, has been completed.

It is obvious that various modifications may be made in the constructions shown in the drawing and above particularly described, within the principle and scope of the invention as defined in the appended claims.

I claim:

1. In a pupillary distance measure, the combination of a flat strip to be disposed substantially horizontally and provided with elongated aligned end portions of uniform width providing upper and lower parallel edges and each such end portion being provided longitudinally with an elongated observation opening, each end portion having a scale adjacent one edge of each such opening on the front face of the end portion of the strip, two independently operable pupillary slides slidably engaging respectively the opposite edges of the end portions of the strip and forming a window frame at the front thereof, a transparent glass in each window frame and having thereon a pupillary-measuring line cooperating with the said scale, the said strip between the observation openings being provided in its lower edge with a deep notch the opposed shoulders of which form a nose-bridge so that thereby a separate contemporary indication will be maintained of the distance of each of the two eyes of the person from the center line of the bridge of the nose.

2. The invention defined in claim 1, in combination with a shutter for each of the said observation openings longitudinally slidable at the back of the respective end portions of the strip, and a manually operable member connected to the shutters for the operation thereof.

3. The invention defined in claim 1, in combination with a shutter for each of the said observation openings slidably mounted on the adjacent end portion of the strip at the back thereof to slide inward towards the nose-bridge for closing such opening and to slide outward for uncovering this opening, a cross strap at the back of the said strip above the nose-bridge notch connecting together the two shutters for simultaneous sliding movement, and a handle for sliding the shutters and connected thereto to have sliding movement therewith and so disposed as to be accessible for operation from the front of the said strip.

4. The invention defined in claim 1, in which each of the said slides has a lower edge adjacent to the said lower edge of the said strip, in combination with an operating handle for each of the said slides connected thereto at the lower edge thereof adjacent the lower edge of the said strip and projecting laterally outward beyond the slide away from the nose-bridge with the outer end of this handle terminating in a finger-piece.

5. In a pupillary distance measure, the combination of a flat strip positioned to provide upper and lower edges and having elongated aligned end portions each provided longitudinally with an elongated observation opening, a pupillary measuring slide on each of these end portions in cooperation with the adjacent observation opening, each end portion of the strip being provided with a countersunk groove in its back and extending from its outer end to the inner end of the adjacent observation opening, a longitudinally sliding shutter for each observation opening guided in the countersunk groove at the back of the end portion of the strip so as to be substantially flush therewith at the back and arranged to slide from the adjacent outer end of the strip inward for closing the adjacent observation opening, each end portion of the strip being provided with a longitudinal slot through it between its outer end and the observation opening, and an operating button for each shutter connected thereto through the said slot and projecting from the front face of the strip.

6. The invention defined in claim 5, in which the said strip between the said observation openings has in its said lower edge a deep notch the opposed shoulders of which form a nose-bridge and has a longitudinal groove in the back of the said strip above the nose-bridge notch, in combination with a cross strap countersunk in the said longitudinal groove and connecting together the two shutters for unitary sliding movement in the same direction for closing either of the observation openings when the other is opened.

7. The invention defined in claim 1, in which the said window-frame is rectangular with inturned lateral flanges for holding the said glass and is guided on the said strip by means of upper and lower rearwardly-turned flanges having terminal portions engaging with the rear face of the upper and lower margins of the strip adjacent to its said upper and lower edges, these upper and lower flanges holding the glass in place at its upper and lower edges, the said lower flange having a hole therein, and a handle for operating the slide and comprising a strip of metal having a shank portion interposed between the lower flange and the lower edge of the glass and having a downwardly-indented lug entering the hole in the said lower flange to form an anchor, the said shank projecting from the window-frame slide outwardly away from the nose-bridge of the strip and the outer end portion of this shank having a finger-piece thereon.

8. The invention defined in claim 1, in which the said window-frame is rectangular with inturned lateral flanges for holding the said glass and is guided on the said strip by means of upper and lower rearwardly-turned flanges having terminal portions engaging with the rear face of the upper and lower margin of the strip adjacent to its said upper and lower edges, these upper and lower flanges also holding the glass in place at its upper and lower edges, the glass at its upper edge projecting above the upper edge of the said strip and the glass at its lower edge being flush with the lower edge of the strip, a friction member carried by the said upper flange above the upper edge of the said strip to have frictional sliding engagement with the latter, and a handle for operating the slide and comprising a shank portion interposed between the lower flange and the lower edges of the glass and strip, the said lower flange having a hole therein, the said shank having a downwardly-indented lug entering the hole in the said lower flange to form an anchor, the said shank projecting from the window-frame outwardly away from the nose-bridge of the strip and at its forward edge being offset rearwardly from the front of the window-frame and substantially into alignment with the front face of the strip, the outer end portion of this shank having at the front and rear thereof downwardly-turned wings which form a finger-piece.

9. In a device for measuring the pupillary distance, the combination comprising an elongated member having means intermediate its ends for positioning the member upon the nose of a person and a section on each side of the positioning means shaped to permit unobstructed vision, a scale on each section of the member permitting unobstructed vision, a pair of slides slidably mounted on the member and each slide having an indicator cooperating with a scale for indicating the pupillary distance of each eye of a person, and a pair of shutters each movably mounted on the member adjacent one of the sections of the cross member shaped to permit unobstructed vision and movable from a position covering the said section of the member to a position uncovering the said section.

10. In a device for measuring the pupillary distance, the combination comprising an elongated member having means intermediate its ends for positioning the member upon the nose of a person and an elongated observation opening on each side of the positioning means, a scale on the member for each observation opening, a slide carrying an indicator for each scale, and a shutter for each observation opening movably mounted on the member adjacent the observation opening and being movable from a position covering the observation to a position uncovering the observation opening.

11. In a device for measuring the pupillary distance, the combination comprising an elongated member having means intermediate its ends for positioning the member upon the nose of a person and an elongated observation opening on each side of the positioning means, a scale on the member for each observation opening, a slide carrying an indicator for each scale, and a shutter for each observation opening slidably mounted on the member for movement longitudinally thereof to cover and uncover the observation opening, and a strap connecting the two shutters together for simultaneous operation thereof, the length of the distance between the points of connection of the strap being such that when one shutter is positioned covering its observation opening, the other shutter is in its uncovering position.

HANS CLEMENT.